United States Patent
Farrenkopf (10) Patent No.: US 6,714,067 B1
(45) Date of Patent: Mar. 30, 2004

(54) BOOTSTRAP CAPACITOR LOW VOLTAGE PREVENTION CIRCUIT

(75) Inventor: Douglas Robert Farrenkopf, Campbell, CA (US)

(73) Assignee: National Semiconductor Corporation, Santa Clara, CA (US)

(*) Notice: Subject to any disclaimer, the term of this patent is extended or adjusted under 35 U.S.C. 154(b) by 0 days.

(21) Appl. No.: 10/165,218

(22) Filed: Jun. 6, 2002

Related U.S. Application Data (63) Continuation-in-part of application No. 09/766,532, filed on Jan. 18, 2001, now abandoned.

(51) Int. Cl.[7] ............................................. H03K 7/612
(52) U.S. Cl. ..................... 327/589; 327/108; 327/538
(58) Field of Search ............................... 327/589, 108, 327/538; 323/271, 225, 288, 290

(56) References Cited

U.S. PATENT DOCUMENTS

| | | | | | |
|---|---|---|---|---|---|
| 5,408,150 | A | * | 4/1995 | Wilcox | 327/108 |
| 5,627,460 | A | * | 5/1997 | Bazinet et al. | 323/288 |
| 5,705,919 | A | * | 1/1998 | Wilcox | 323/282 |
| 6,057,675 | A | * | 5/2000 | Tateishi | 323/283 |

* cited by examiner

Primary Examiner—Terry D. Cunningham
Assistant Examiner—Quan Tra
(74) Attorney, Agent, or Firm—Merchant & Gould P.C.; Joshua W. Korver (57) ABSTRACT

A bootstrap capacitor low voltage prevention circuit and method to control the same is provided. When a low voltage situation is detected the bootstrap capacitor is charged. An over voltage protection circuit is included that prevents the circuit from staying in an over voltage situation for a long period of time.

21 Claims, 6 Drawing Sheets

BOOTSTRAP CAPACITOR LOW VOLTAGE PREVENTION CIRCUIT

RELATED APPLICATIONS

This is a continuation-in-part of U.S. patent application Ser. No. 09/766,532, entitled "Bootstrap Capacitor Low Voltage Prevention Circuit," filed Jan. 18, 2001now abandoned, under 35 U.S.C. §120 and 37 C.F.R. §1.53(b), which is incorporated herein by reference.

FIELD OF THE INVENTION

The present invention relates to analog and digital circuits. In particular, the present invention relates to a bootstrap capacitor low voltage prevention circuit.

BACKGROUND OF THE INVENTION

Bootstrap capacitors are commonly used in many electronic circuits. A bootstrap capacitor charging circuit typically charges a bootstrap capacitor when a signal, such as a voltage, goes below a predefined threshold. On the other hand, when the signal is above the predefined threshold the bootstrap capacitor is not charged. Therefore, the amount of charging time for a bootstrap capacitor is the amount of time the signal is below the predefined threshold.

In some operating conditions, the bootstrap capacitor may not be charged to a sufficient value to provide a stable signal to drive a circuit. This can cause a circuit to become non-operational. For example, if a bootstrap capacitor is not charged sufficiently, a switch may be left on in a weak state. This can result in the circuit being uncontrollable. Additionally, if the switch is left on, voltages in the circuit may rise above the intended values causing an over voltage condition.

SUMMARY OF THE INVENTION

The present invention is directed at addressing the above-mentioned shortcomings, disadvantages and problems, and will be understood by reading and studying the following specifications.

In accordance with aspects of the present invention, an apparatus and method are provided for a bootstrap capacitor low voltage prevention circuit.

In one aspect of the invention, a switched voltage is coupled to a switching regulator circuit that outputs an output voltage and provides a feedback signal to a control logic circuit. The control logic circuit measures the voltage across a bootstrap capacitor and controls the operation of the switched voltage as well as charging the bootstrap capacitor depending on the state of the switch.

Another aspect of the invention includes an over voltage protection circuit and temperature shutdown circuit. If an over voltage condition is detected the circuit is returned to a state of normal operating conditions. Similarly, if the circuit reaches a predetermined temperature, the circuit is shut down.

Yet another aspect of the invention includes a method of controlling a bootstrap capacitor low voltage prevention circuit. In accordance with this aspect, the voltage across a bootstrap capacitor is measured. When the measured voltage is too low, the charging of the bootstrap capacitor is stopped, a switched voltage is drained to a predetermined level, and the bootstrap capacitor is charged to a predetermined level.

Still yet another aspect of the invention includes a circuit and method for analyzing a waveform. A signal is analyzed to determine if the bootstrap capacitor should be drained or charged. In accordance with this aspect of the invention, the bootstrap capacitor is not charged unless the value of the signal drops below a predetermined threshold.

DETAILED DESCRIPTION OF THE PREFERRED EMBODIMENT

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Figure 1:
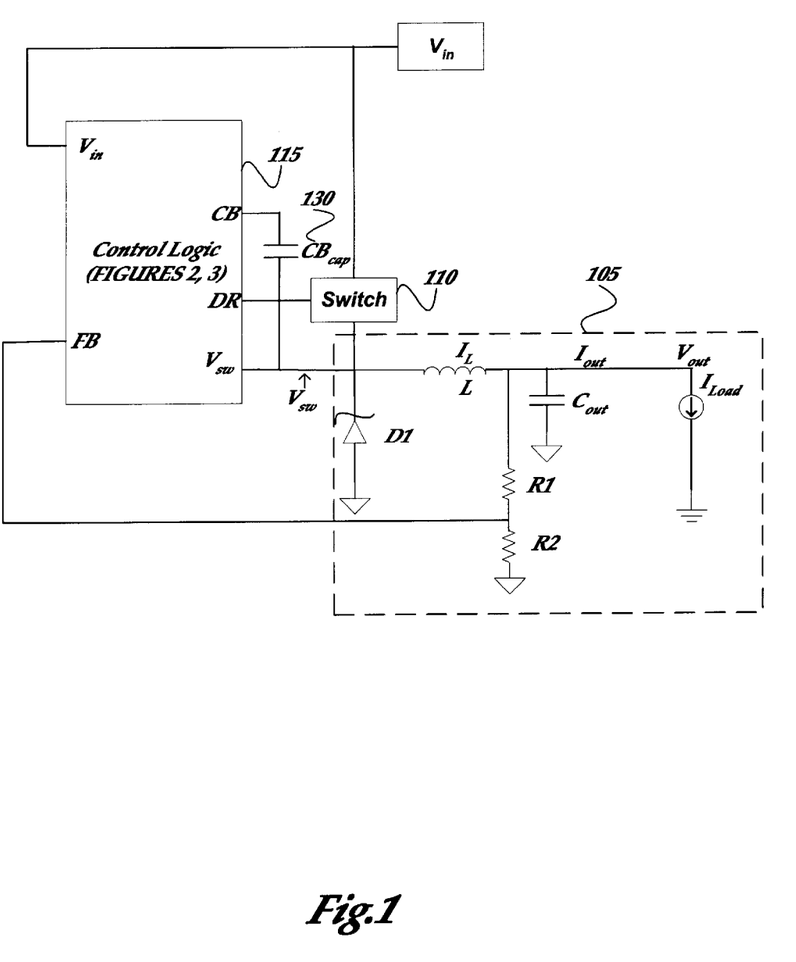
FIG. 1 shows an overview schematic diagram of a bootstrap capacitor low voltage prevention circuit.

FIG. 1 shows an overview schematic of a bootstrap capacitor low voltage prevention circuit. A switching regulator (105) indirectly regulates an average DC output voltage by selectively storing energy by switching energy on and off an inductor (L). In one embodiment of the invention, a buck controller circuit is used as the switching regulator. By comparing the output voltage ($V_{out}$) to a reference voltage the inductor current ($I_L$) is controlled to provide the desired output voltage for the circuit.

A switch (110) receives a voltage signal $V_{in}$ and outputs a voltage signal $V_{SW}$ to switching regulator 105. In one embodiment of the invention when the switch is in the on state, switching regulator 105 receives $V_{in}$ and receives no $V_{in}$ signal when the switch is in the off state. Control logic circuit 115 has inputs for receiving feedback from switching regulator 105, the voltage signal $V_{SW}$, and voltage signal $V_{in}$. Control logic circuit 115 contains logic for controlling the charging of $CB_{cap}$ 130. $CB_{cap}$ 130 charges when switch 110 is in the off state, which occurs when the value of signal $V_{SW}$ is below a predefined threshold. According to one embodiment of the invention, the predefined threshold is zero volts. The feedback (FB) input of control logic circuit 115 senses feedback from switching regulator 105 and adjusts the duty cycle of switch 110 to keep the voltage signal $V_{out}$ of the circuit at its desired value. Control logic 115 also contains circuitry to detect when a low voltage is present on $CB_{cap}$ 130 and prevents the circuit from operating when this low voltage condition exists. According to another embodiment of the invention, control logic circuit contains an over voltage protection (OVP) circuit and temperature shutdown circuit.

Figure 2:
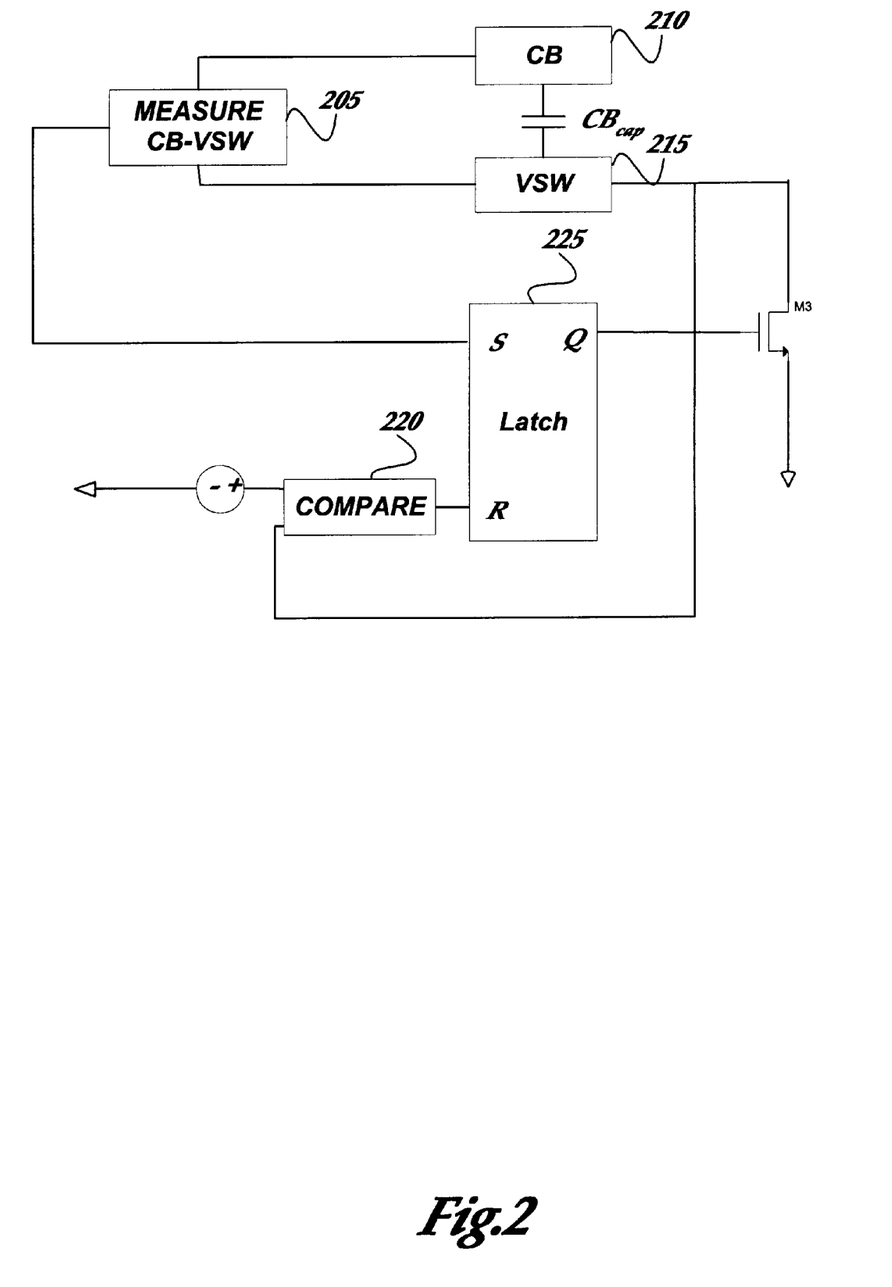
FIG. 2 shows a schematic diagram of a bootstrap capacitor low voltage prevention circuit.

FIG. 2 shows a schematic diagram of a bootstrap capacitor low voltage prevention circuit. Measurement circuit 205 measures the voltage across the bootstrap capacitor ($CB_{cap}$) between the points CB 210 and VSW 215. Latch 225 is set when the measured voltage is small. According to one embodiment of the invention, the measured voltage is small if the difference value is below about 1.6V. Latch 225 is coupled to measurement circuit 205. Measurement circuit 205 sets latch 225 when the $CB_{cap}$ voltage drops to a low but still circuit controllable value of about 1.5V, according to one embodiment of the invention. When latch 225 is set, the driver (not shown) that charges $CB_{cap}$ is turned off. Latch 225 also causes switch M3 to discharge VSW 215 until VSW 215 is some predefined value above ground. According to one embodiment of the invention, this value is approximately 200 mV above ground. Once this occurs, $CB_{cap}$ is fully charged and compare circuit 220 resets latch 225. Compare circuit 220 receives signal VSW and a predetermined reference signal. In one embodiment of the invention, the reference signal is about 200 mV above ground. Compare circuit 220 trips depending on the values of VSW and the reference signal. When compare circuit 220 trips, latch 225 is reset, and the circuit will operate in normal operation.

Figure 3:
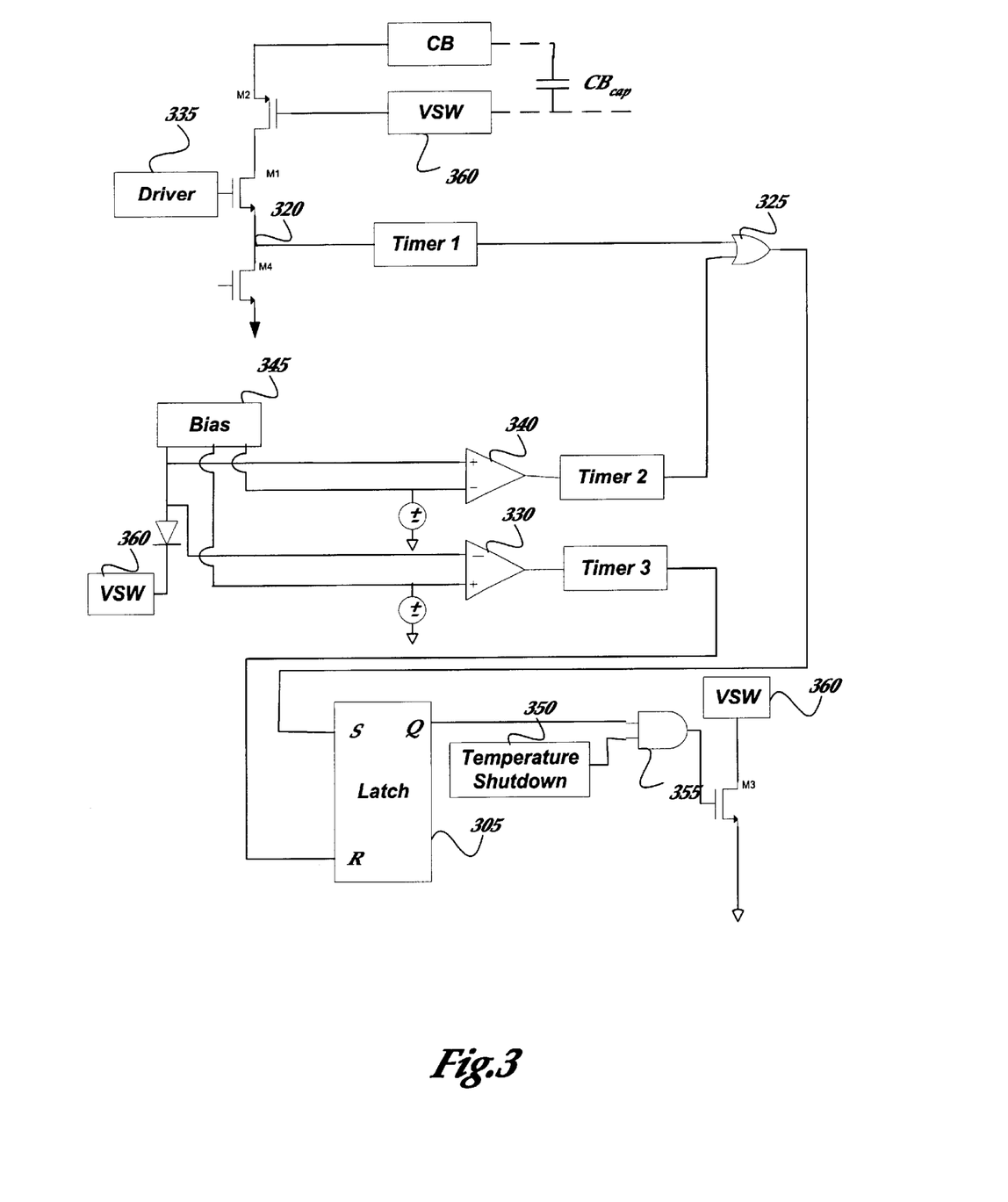
FIG. 3 illustrates a schematic diagram of a bootstrap capacitor low voltage prevention circuit including an over voltage mode protection circuit and temperature shutdown circuit.

FIG. 3 illustrates a schematic diagram of a bootstrap capacitor low voltage prevention circuit including an over voltage mode protection (OVP) circuit and temperature shutdown circuit.

The OVP mode of FIG. 3 will now be described. Referring to FIG. 1, when $1_{out}$ becomes low enough $V_{out}$ rises. This occurs because switch 110 turns on and then does not turn off until $I_L$ reaches some finite value. Referring back to FIG. 3, switch M1 is turned off when $V_{out}$ is too high of a value. According to one embodiment, $V_{out}$ a comparator is used to determine if $V_{out}$ is too high a value. Switch M1 remains off until $I_{out}$ or feedback resistors R1 and R2 (FIG. 1) discharge $V_{out}$ to a lower threshold value. The determination of the values depends on the operating characteristics of the chip. Alternatively, switch M1 may remain off for a predetermined period of time. This period of time may be chosen based on the value of $V_{out}$. During OVP, bias current is not drawn down switch M1 so that the $CB_{cap}$ is not being discharged. Additionally, when the circuit is in OVP mode, switch M1 is disabled. In OVP mode, $CB_{cap}$ is not constantly charged. The $CB_{cap}$ voltage is monitored to determine if it drops to a low but still controllable value. According to one embodiment of the invention, switches M1–M4 are transistors.

FIG. 3 also shows a temperature shutdown circuit for the bootstrap capacitor low voltage prevention circuit. The circuit is shut down if a predetermined temperature is reached within the circuit. According to one particular embodiment, switch M3 is turned off when the chip reaches the predetermined temperature. The predetermined temperature is determined by the operating characteristics of the components used in the chip. When M3 is turned on, the output capacitance $C_{out}$ (See FIG. 1) is discharged. This helps control switch M2 and VSW voltage 360 discharges to the proper operating level. When the predetermined temperature is reached, temperature shutdown 350 is set low. And gate 355 receives the low signal and turns off switch M3. When switch M3 is on, VSW 360 discharges until its value is some predefined amount above ground. According to one embodiment of the invention, this value is approximately 200 mV above ground. Once this occurs, $CB_{cap}$ is fully charged and the circuit is reset as described above.

Switch M4 pulls a bias current when $CB_{cap}$ is not being discharged. According to one embodiment of the invention, switch M4 pulls a bias current of about 10 uA. Timer 1 has an input from node 320 that is low when the value of CB–VSW is low. This results when the $CB_{cap}$ voltage is low. The W/L ratio of transistor M2 is adjusted such that the value of the signal goes low at a voltage high enough to operate switch 110 shown in FIG. 1 reliably. According to one particular embodiment, value is around 1.5V. The length and width of M4 can also be adjusted to the same length and width as M2. Timer 1 measures the time the value of the signal at node 320 is low. When the signal is low for a time longer than predetermined time T1 the signal output from Timer 1 is high setting latch 330. Predetermined time T1 is chosen such that the period is longer than the switching frequency of $V_{SW}$ insuring that the circuit is allowed to function when $V_{SW}$ is high.

Timer 2 measures the time VSW 360 is high. The output of Timer 2 is set high if VSW 360 is high for a time longer than a predetermined time and the circuit is not in OVP mode. Timer 2 has an input from comparator 340. Comparator 340 has a plus (non-inverting) input and a minus (inverting) input. Plus input of comparator 340 is coupled to signal VSW 360. The minus input is coupled to an offset voltage provided by bias 345, which according to one embodiment is approximately 200 mV. Comparator 340 is set to trip depending on the values of VSW 360 the bias signal. According to one embodiment of the invention, comparator 340 trips when signal $V_{SW}$360 is above the bias signal. When the output of Timer 2 is high latch 305 is set.

Timer 3 measures the time VSW 360 is low. The output of Timer 3 is set high if VSW 360 is low for a time longer than a predetermined time. Timer 3 has an input from comparator 330. Comparator 330 has a plus (non-inverting) input and a minus (inverting) input. Plus input of comparator 330 is coupled to an offset voltage, which according to one embodiment is approximately 200 mV, provided by bias 345. The minus input is coupled to signal VSW 360. Comparator 330 trips when the bias signal is larger than the VSW 360 signal. Latch 305 is reset based on Timer's output. According to one embodiment of the invention, latch 305 is reset if Timer's output is high. If set is high (1) then a fault condition has occurred within the circuit. When Q is high driver 335 turns off switch M1. In one embodiment of the invention, M1 is a transistor.

According to another embodiment of the invention, signal $V_{SW}$ is analyzed to determine if $CB_{cap}$ should be drained or charged. $CB_{cap}$ is not charged unless the value of $V_{SW}$ drops below a predetermined threshold. According to one embodiment of the present invention, this predetermined threshold is 200 mV. In one actual embodiment, the waveform is analyzed for three (3) periods or longer. The time period may be adjusted to other time periods, such as 2, 3, 4, and the like.

Figure 4A:
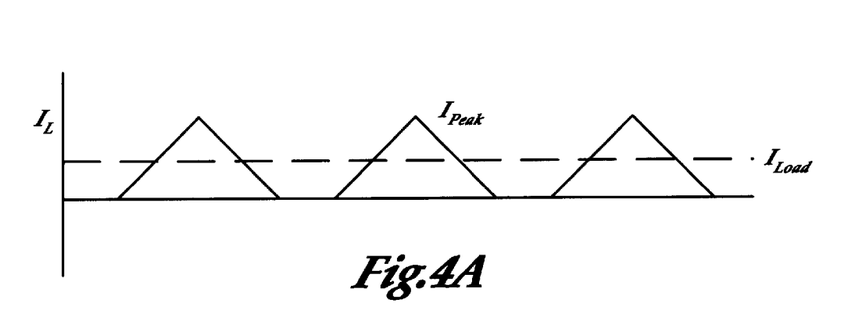
FIGS. 4A–4C show exemplary waveforms.

FIG. 4A shows exemplary graphs of IL and VSW waveforms when a($V_{in-Vout}$) and $I_{out}$ is sufficiently high to operate the circuit. When the switch (FIG. 1) is on, IL increases from zero (0) to $I_{peak}$ with a slope of ($V_{in-Vout}$)/L. Alternatively, when the switch is off IL is conducted through the Schottky diode D1 (FIG. 1) and ramps downward having a slope of $V_{out}$/L. The charging time of $CB_{cap}$ is proportional to the value of $I_{peak}$.

Figure 4B:
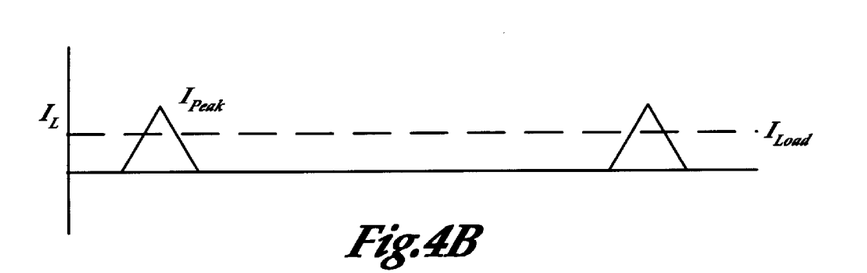

FIG. 4B shows the IL and VSW waveforms when ($V_{in}$–$V_{out}$) and $I_{out}$ is low. When $I_{peak}$ is low the time charging $CB_{cap}$ is low resulting in the voltage across the $CB_{cap}$ to start dropping. When $I_{Load}$ is low enough, inductor L (FIG. 1) resets itself before VSW has a chance to go below zero volts. Under these conditions, the voltage across $CB_{cap}$ eventually becomes low enough to lock VSW permanently off and VSW becomes equal to $V_{out}$ causing the converter to be locked into this position.

Figure 4C:
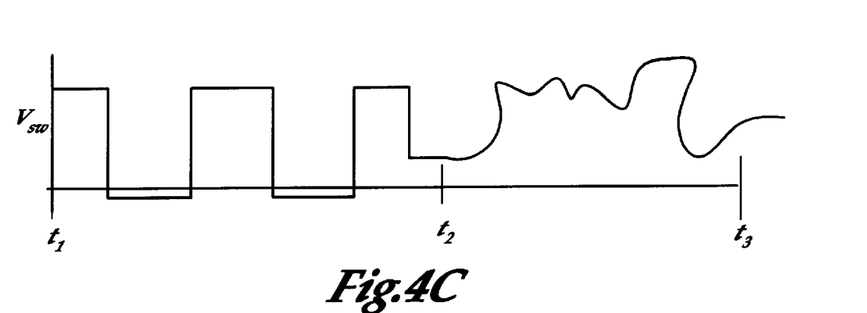

FIG. 4C shows an exemplary waveform of VSW. From time t1 through t2 the value of VSW drops below zero volts causing the $CB_{cap}$ to charge. During this time period the circuit operates properly. From time t2 through time t3, however, VSW does not drop below zero volts resulting in $CB_{cap}$ not charging and possibly locking VSW permanently in the off position.

If $I_{out}$ becomes low enough, the converter causes $V_{out}$ to rise. This is caused by the fact that M1 will be turned on until the load current $I_{Load}$ reaches some predefined value. If the predefined value is not reached then the switch M1 is never turned off. When output current $I^{out}$ is lower than the average value of load current IL, $V_{out}$ rises. Therefore, according to one embodiment of the invention, an over voltage protection circuit is implemented. A comparator turns off switch M1 when $V_{out}$ is above a predetermined threshold. M1 stays off until $V_{out}$ is discharged below the predetermined threshold value. This may be accomplished by discharging through feedback resistors.

Figure 5:
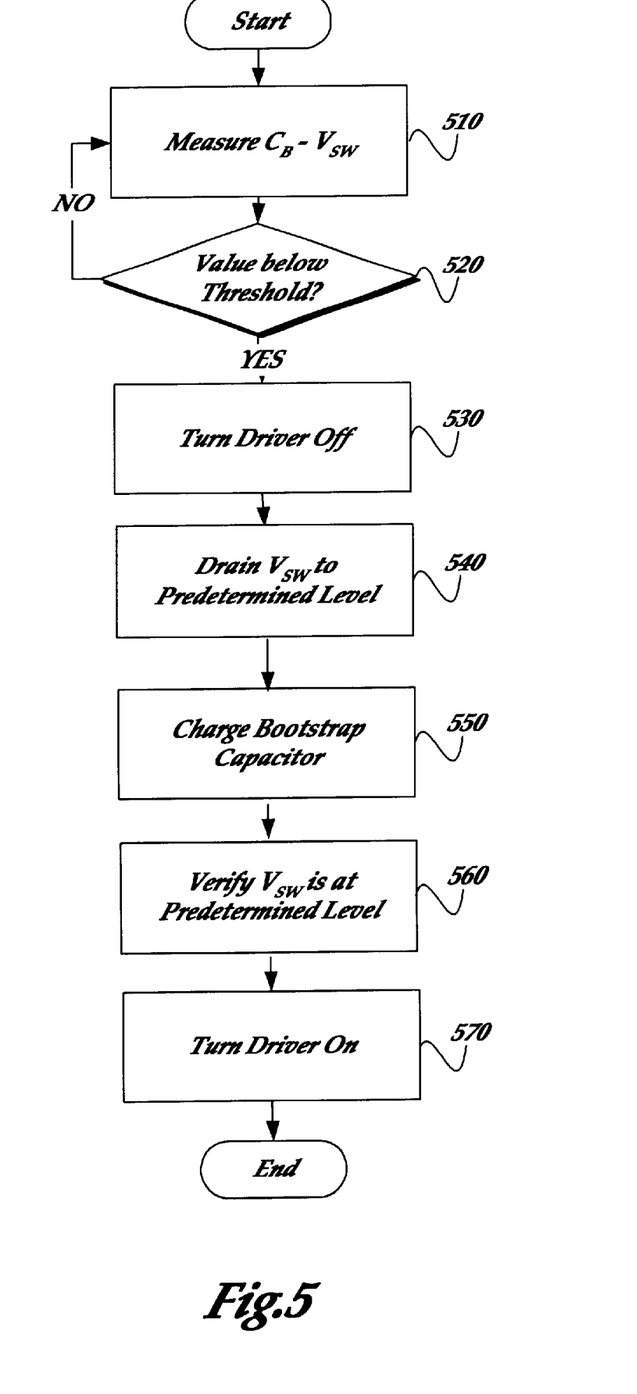
FIG. 5 illustrates a flow diagram of the operation a bootstrap capacitor low voltage prevention circuit.

FIG. 5 shows an overview flow diagram illustrating the operation of the bootstrap capacitor low voltage prevention circuit. When the logic flow moves to a block 510, the value of CB–VSW is measured. Advancing to a decision block 520, a determination is made as to whether the measured value is low. As discussed above, the value is low when the voltage at $CB_{cap}$ does not reliably control the circuit. If the value of CB–VSW is not below the predetermined value the logical flow returns to a block 510. If the measured value is low the logic advances to a block 530. At a block 530 the driver is turned off. VSW is drained to a predetermined value (block 40). According to one embodiment of the invention, VSW is drained to 200 mV above ground. Transitioning to a block 550, the bootstrap capacitor is charged. Next, at a block 560, VSW is verified to be at the predetermined value. The driver is then reset and the circuit continues in normal operation (block 570). The logical flow then ends.

Figure 6:
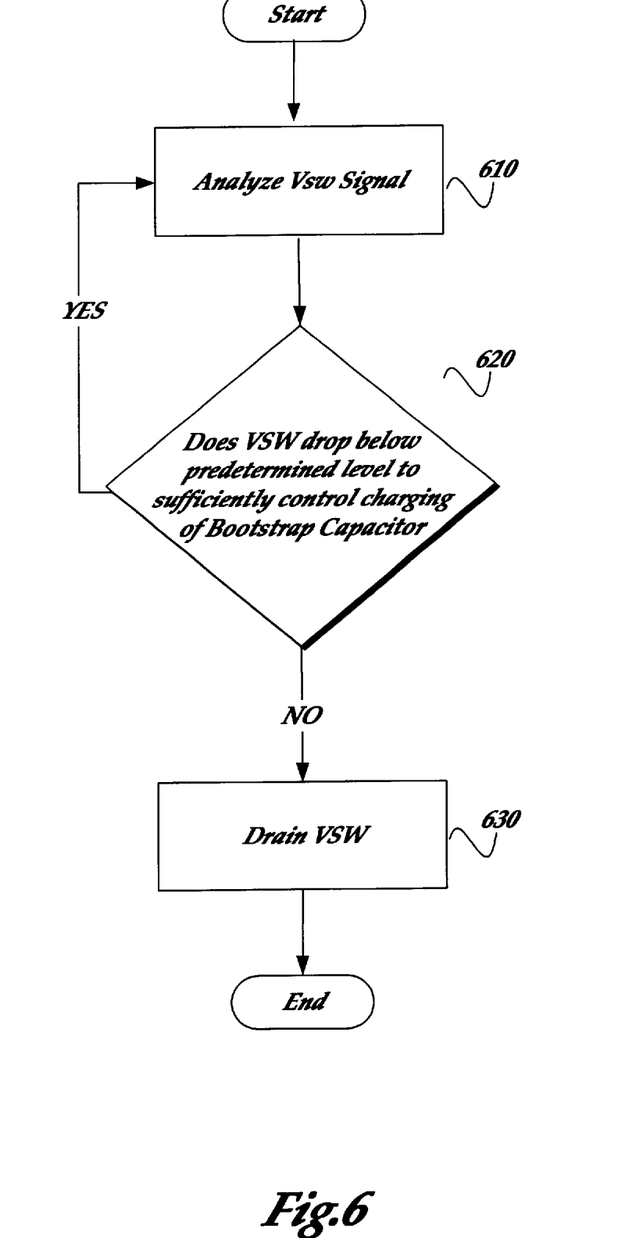
FIG. 6 shows an operational flow diagram for analyzing a waveform used to aid in controlling operation of a bootstrap capacitor low voltage prevention circuit according to an embodiment of the present invention.

FIG. 6 shows an operational flow diagram for analyzing a signal used to aid in controlling operation of a bootstrap capacitor low voltage prevention circuit according to an embodiment of the present invention. Starting at a block 610 the signal VSW is analyzed. According to one embodiment of the invention, this includes determining a value for the signal. Advancing to a decision block 620, a decision is made as to whether the signal is below a predetermined value. According to one embodiment of the invention, this predetermined value is 200 mV. In one embodiment of the invention, decision block 620 determines if the signal has dropped below the predetermined value for a sufficient time to properly control the charging of the bootstrap capacitor. If not, the logical flow advances to a block 630, which drains VSW to a predetermined level. According to one embodiment of the invention, the predetermined level is 200 mV. If so, the logical flow returns to a block 610. The logical flow then ends.

In one embodiment of the present invention, the methods and apparatus of the present invention operate when a low-resistance switch is not available at the power supply. In synchronous converters, where the switch is operated synchronously, low-resistance switches are used. When a low-resistance switch (not shown) is used, the switch node is pulled and held at ground, charging the bootstrap capacitor when the low-resistance switch is activated. However, a low-resistance switch may present a tradeoff by having an increased size in comparison to other switches. The size of low-resistance switch is a consideration as the circuit of the present invention is utilized for low voltage prevention, rather than normal operation. It may be undesirable to dedicate a relatively large amount of area to a circuit that does not operate during normal operation.

In non-synchronous circuits, where the switch is operated asynchronously, a high-resistance switch may be utilized. In previous circuits, the voltage at the switch node rises in response to increased current through the switch node. If attempted to be used in a synchronous circuit, the high-resistance switch is unable to hold the switch node at ground in response to the current increase. Accordingly, the bootstrap capacitor may not fully charge before the voltage at the switch node rises to a sufficient potential to prevent the bootstrap capacitor from reaching a full charge.

According to the present invention, a non-synchronous circuit is utilized that has a high-resistance switch. Despite the high resistance, the switch node is still pulled towards ground for a significant amount of time, allowing the bootstrap capacitor to reach a full charge and sustain a full charge for a significant interval of time (e.g., 0.5–5 msec). The interval time is more than enough to allow the bootstrap capacitor to charge up, which typically reaches a full charge in 10–100 μsec. The present invention avoids a requirement to utilize a low-resistance switch, reducing the amount of circuit area required to prevent a low voltage condition.

The above specification, examples and data provide a complete description of the manufacture and use of the composition of the invention. Since many embodiments of the invention can be made without departing from the spirit and scope of the invention, the invention resides in the claims hereinafter appended.

I claim:

1. An apparatus for a bootstrap capacitor low voltage prevention circuit, comprising:

a switch connected to an input voltage and coupled to a control logic circuit that produces a switched voltage at a node in response to a signal from the control logic circuit;

the node coupled to a switching regulator circuit that outputs an output voltage and provides a feedback signal coupled to the control logic circuit;

the control logic circuit measuring the voltage across a bootstrap capacitor and controlling operation of the switch by providing the signal based on the measured voltage;

a charging circuit that charges the bootstrap capacitor depending on the state of the switch, the bootstrap capacitor being fully charged when the switched voltage is drained to a predetermined level; and a temperature shutdown circuit for shutting down the bootstrap capacitor low voltage prevention circuit when a predetermined temperature is reached.

2. The apparatus as in claim 1, wherein the temperature shutdown circuit further comprises:

a temperature sensor to measure temperature;

a comparator to determine when a predetermined temperature has been reached; and a shutdown circuit for shutting down the circuit when the predetermined temperature has been reached.

3. An apparatus for a bootstrap capacitor low voltage prevention circuit, comprising:

a switch connected to an input voltage and coupled to a control logic circuit that produces a switched voltage at a node in response to a signal from the control logic circuit;

the node coupled to a switching regulator circuit that outputs an output voltage and provides a feedback signal coupled to the control logic circuit;

the control logic circuit measuring the voltage across a bootstrap capacitor and controlling operation of the switch by providing the signal based on the measured voltage;

a charging circuit that charges the bootstrap capacitor depending on the state of the switch, the bootstrap capacitor being filly charged when the switched voltage is drained to a predetermined level; and a switched voltage signal analyzer circuit wherein the switched voltage analyzer circuit further comprises:

a comparator circuit that outputs a comparator signal indicating when the switched input voltage is above or below a predetermined value;

a timer circuit coupled to the output of the comparator circuit that times a period when the comparator signal indicates the switched input voltage is above or below the predetermined value and outputs a time signal based on the timed period; and a reset circuit coupled to the time signal for resetting the circuit based on the time signal.

4. A method for controlling a bootstrap capacitor low voltage prevention circuit, comprising:

measuring a voltage across a bootstrap capacitor that is coupled between a control logic and a node;

determining when the voltage is too low; and when it is determined that the voltage is too low:

turning off a driver controlling the charging of the bootstrap capacitor;

activating a switch that is connected between the node and the input voltage in response to the control logic, wherein the voltage at the node corresponds to a switched voltage;

draining the switched voltage to a predetermined level; and charging the bootstrap capacitor to a predetermined level.

5. The method of claim 4, further comprising determining if the circuit is in an over voltage condition.

6. The method of claim 4, further comprising:

measuring a temperature of the circuit; and shutting down the circuit when the measured temperature is above a predetermined value.

7. The method of claim 4, further comprising analyzing the switched voltage and resetting the circuit based on the analyzed switched voltage.

8. The method of claim 4, further comprising resetting the circuit when the bootstrap capacitor is charged.

9. The method of claim 4, wherein measuring the voltage across the bootstrap capacitor further comprises:

setting a latch based on the measured voltage; and turning off the charging circuit when the latch is set.

10. The method as in claim 5, wherein determining if the circuit is in an over voltage condition, further comprises:

determining if the output voltage is above a predetermined value; and discharging the output voltage when it is determined that the output voltage is above the predetermined value.

11. The method as in claim 7, wherein analyzing the switched voltage and resetting the circuit based on the analyzed switched voltage the switched voltage analyzer circuit further comprises:

indicating when the switched input voltage is above or below a predetermined value;

timing a period of time when the switched input voltage is above or below the predetermined value;

outputting the period of time; and resetting the circuit based on the period of time.

12. An apparatus for a bootstrap capacitor low voltage prevention circuit, comprising:

a means for measuring the voltage across a bootstrap capacitor that is charged according to in input voltage;

a means for determining when the voltage is too low; and when the voltage is determined to be too low, providing:

a means for turning off a driver controlling the charging of the bootstrap capacitor;

a means for draining a switched voltage to a predetermined level that is connected to the input voltage; and charging the bootstrap capacitor to a predetermined level.

13. The apparatus as in claim 12, further comprising:

a means for determining when an over voltage condition exists within the bootstrap capacitor low voltage prevention circuit; and a means for determining when the temperature of the bootstrap capacitor low voltage prevention circuit is too high, and when it is determined that the temperature is too high:

a means for shutting down the bootstrap capacitor low voltage prevention circuit.

14. An apparatus for a bootstrap capacitor low voltage prevention circuit, comprising:

a switch coupled to an input voltage and produces a switched voltage at a node;

the node coupled to a switching regulator circuit that outputs an output voltage and provides a feedback signal coupled to a control logic circuit;

the control logic circuit measuring the voltage across a bootstrap capacitor and controlling operation of the switch based on the measured voltage;

a charging circuit that charges the bootstrap capacitor depending on the state of the switch, the bootstrap capacitor being fully charged when the switched voltage is drained to a predetermined level; and a temperature shutdown circuit for shutting down the bootstrap capacitor low voltage prevention circuit when a predetermined temperature is reached.

15. The apparatus as in claim 14, wherein the temperature shutdown circuit further comprises:

a temperature sensor to measure temperature;

a comparator to determine when a predetermined temperature has been reached; and a shutdown circuit for shutting down the circuit when the predetermined temperature has been reached.

16. An apparatus for a bootstrap capacitor low voltage prevention circuit, comprising:

a switch coupled to an input voltage and produces a switched voltage at a node;

the node coupled to a switching regulator circuit that outputs an output voltage and provides feedback signal coupled to a control logic circuit;

the control logic circuit measuring the voltage across a bootstrap capacitor and controlling operation of the switch based on the measured voltage;

a charging circuit that charges the bootstrap capacitor depending on the state of the switch, the bootstrap capacitor being fully charged when the switched voltage is drained to a predetermined level; and a switched voltage signal analyzer circuit that comprises:
 a comparator circuit that outputs a comparator signal indicating when the switched input voltage is above or below a predetermined value;
 a timer circuit coupled to the output of the comparator circuit that times a period when the comparator signal indicates the switched input voltage is above or below the predetermined value and outputs a time signal based on the timed period; and
 a reset circuit coupled to the time signal for resetting the circuit based on the time signal.

17. A method for controlling a bootstrap capacitor low voltage prevention circuit, comprising:

measuring the voltage across a bootstrap capacitor;

determining when the voltage is too low; and when it is determined that the voltage is too low:
 turning off a driver controlling the charging of the bootstrap capacitor;
 draining a switched voltage to a predetermined level;
 charging the bootstrap capacitor to a predetermined level;
 measuring a temperature of the circuit; and
 shutting down the circuit when the measured temperature is above a predetermined value.

18. A method for controlling a bootstrap capacitor low voltage prevention circuit, comprising:

measuring the voltage across a bootstrap capacitor;

determining when the voltage is too low; and when it is determined that the voltage is too low:
 turning off a driver controlling the charging of the bootstrap capacitor;
 draining a switched voltage to a predetermined level;
 charging the bootstrap capacitor to a predetermined level; and
 analyzing the switched voltage and resetting the circuit based on the analyzed switched voltage by indicating when the switched input voltage is above or below a predetermined value, timing a period of time when the switched input voltage is above or below the predetermined value, outputting the period of time, and resetting the circuit based on the period of time.

19. An apparatus for a bootstrap capacitor low voltage prevention circuit, comprising:

a means for measuring the voltage across a bootstrap capacitor;

a means for determining when the voltage is too low; and when the voltage is determined to be too low:
 a means for turning off a driver controlling the charging of the bootstrap capacitor;
 a means for draining a switched voltage to a predetermined level; and
 a means for charging the bootstrap capacitor to a predetermined level;

a means for determining when an over voltage condition exists within the bootstrap capacitor low voltage prevention circuit; and a means for determining when the temperature of the bootstrap capacitor low voltage prevention circuit is too high and when it is determined that the temperature is too high:
 a means for shutting down the bootstrap capacitor low voltage prevention circuit.

20. An apparatus for a bootstrap capacitor low voltage prevention circuit, comprising:

a switch that is operated asynchronously while connected to an input voltage and coupled to a control logic circuit that produces a switched voltage at a node in response to a signal from the control logic circuit;

the node coupled to a switching regulator circuit that outputs an output voltage and provides a feedback signal coupled to the control logic circuit;

the control logic circuit measuring the voltage across a bootstrap capacitor and controlling operation of the switch by providing tee signal based on the measured voltage; and a charging circuit that charges the bootstrap capacitor depending on the state of the switch, the bootstrap capacitor being filly charged when the switched voltage is drained to a predetermined level and the full charge is sustained for a significant time interval.

21. The apparatus as in claim 20, wherein the circuit utilizes a high-resistance switch within the control logic circuit.

* * * * *

UNITED STATES PATENT AND TRADEMARK OFFICE
CERTIFICATE OF CORRECTION

PATENT NO. : 6,714,067 B1
DATED : March 30, 2004
INVENTOR(S) : Farrenkopf

It is certified that error appears in the above-identified patent and that said Letters Patent is hereby corrected as shown below:

Column 4,
Lines 44 and 46, please change "Timer's" to -- Timer 3's --.

Column 7,
Line 18, please change "filly" to -- fully --.

Column 8,
Line 17, please change "to in input voltage" to -- to an input voltage --.

Column 10,
Line 23, please change "high and when" to -- high, and when --.
Line 38, please change "tee" to -- the --.
Line 43, please change "filly" to -- fully --.

Signed and Sealed this

Third Day of August, 2004

JON W. DUDAS
*Acting Director of the United States Patent and Trademark Office*